United States Patent [19]

Kazovsky

[11] Patent Number: 4,824,201

[45] Date of Patent: Apr. 25, 1989

[54] SIMULTANEOUS TRANSMISSION OF LED AND LASER SIGNALS OVER SINGLE MODE FIBER

[75] Inventor: Leonid G. Kazovsky, Aberdeen, N.J.

[73] Assignee: Bell Communications Research, Inc., Livingston, N.J.

[21] Appl. No.: 72,715

[22] Filed: Jul. 13, 1987

[51] Int. Cl.$^4$ .............................................. G02B 6/28
[52] U.S. Cl. ................................. 380/96.16; 455/610; 455/611
[58] Field of Search .............. 455/602, 608, 609, 610, 455/611, 612, 613, 615, 617, 618, 619; 370/11

[56] References Cited

U.S. PATENT DOCUMENTS

| | | | |
|---|---|---|---|
| 3,986,020 | 10/1976 | Kogelnik | 250/199 |
| 4,302,835 | 11/1981 | McMahon | 370/4 |
| 4,307,468 | 12/1981 | Beasley et al. | 455/608 |
| 4,369,524 | 1/1983 | Rawson et al. | 455/606 |
| 4,403,139 | 9/1983 | De Loach, Jr. | 250/205 |
| 4,427,895 | 1/1984 | Eng | 250/551 |
| 4,504,974 | 3/1985 | Rademaker | 455/601 |
| 4,504,976 | 3/1985 | Beaudet | 455/611 |
| 4,561,117 | 12/1985 | Kuhn | 455/608 |
| 4,567,586 | 1/1986 | Koeck | 340/4 |
| 4,581,730 | 4/1986 | Ozeki et al. | 370/2 |
| 4,648,134 | 3/1987 | Stewart | 455/608 |
| 4,704,741 | 11/1987 | Shikada | 455/619 |
| 4,706,300 | 11/1987 | Minemura et al. | 455/608 |

*Primary Examiner*—William L. Sikes
*Assistant Examiner*—Robert E. Wise
*Attorney, Agent, or Firm*—James W. Falk; Stephen M. Gurey

[57] ABSTRACT

At the transmitting end of an optical transmission system, a wide linewidth LED (31) is intensity modulated by a first digital information signal and a narrow linewidth DFB (Distributed Feedback) laser (32) is frequency modulated by a second digital information signal and the two modulated optical signals are combined (33) for transmission over a single mode optical fiber (34). At the receiving end, the intensity modulating digital signal is recovered from the received optical signal by a photodetctor (52). The frequency modulating digital signal is recovered by a coherent receiver (53) which includes a local oscillator (55) the output of which is optically combined (54) with the received optical signal. A photodetector (56) converts this combined optical signal to an electrical IF signal, and an IF demodulator (57) reconstructs the second digital signal therefrom.

20 Claims, 4 Drawing Sheets

SIMULTANEOUS TRANSMISSION OF LED AND LASER SIGNALS OVER SINGLE MODE FIBER

BACKGROUND OF THE INVENTION

This invention relates to optical communications and more particularly to optical transmission systems capable of multiplexing on a single mode fiber optical signals from two types of optical sources.

It has recently been shown that light emitting diode (LED) devices can be used for data transmission over single mode fibers. LEDs which characteristically have wide linewidths advantageously are relatively inexpensive and highly reliable and therefore are likely in the near future to find widespread use for purposes of local data distribution in the telephone plant. Lasers which characteristically have narrow linewidths and are capable of supporting higher bit rate more advanced data services than LEDs are at present still relatively expensive and not as reliable as LEDs. In time, as the cost of laser devices decreases and reliability increases, upgrade of those fiber systems employing LEDs may be desired to provide a subscriber with additional data services that may then be available. Such an upgrade, however, will not likely involve the replacement of the existing LED terminal devices, but rather the addition of laser devices to provide the desired extra services. A transmission system capable of simultaneously transmitting on a single mode filter digital signals from both a wide linewidth LED source and a narrow linewidth laser source is therefore desirable. Wavelength-division multiplexing techniques are well known for multiplexing multiple optical signals on a fiber by using different wavelengths for each transmitted signal. Since the spectrum of the LED source is so wide, however, wavelength division multiplexing techniques can not be readily used to multiplex an LED signal with another optical signal. Therefore a system that can multiplex a wide linewidth signal and a narrow linewidth signal is needed so that efficient use of installed optical transmission facilities can be made.

SUMMARY OF THE INVENTION

In accordance with the present invention, digital signals modulating a wide linewidth LED device and digital signals modulating a narrow linewidth laser device are simultaneously transmitted over a single mode fiber. These signals are either alternatively recovered at the receiver or simultaneously recovered. A subscriber may thus "add on" the additional services being offered on the "laser channel" without the need to disconnect the services that might be already provided by the "LED channel."

In the transmission system of the present invention a first digital information signal intensity modulates (i.e. ON and OFF) a wide linewidth LED transmitting device while a second digital information signal angle modulates (i.e. phase or frequency) a narrow linewidth laser transmitting device. The outputs of each optical device are optically coupled together and transmitted over a single mode fiber to a receiver for recovery of both the first and second digital signals, the first signal being recovered by detecting the intensity variations of the received signal by a photodetector, and the second signal being recovered by detecting the phase or frequency of the received signal.

In a first embodiment, the first information signal and the second information signal are alternatively recovered. The first signal which intensity modulates the transmitting LED is recovered by means of a photodetector without interference from the angle modulating second signal since the latter modulation is not detected by the photodetector. The second signal is recovered by coupling a local oscillator signal to the received optical signal. The combined optical signal is detected by the photodetector and then electrically demodulated by an IF demodulator to recover the modulating digital signal.

In a second embodiment, a coupler at the receiver couples a portion of the received optical signal to a photodetector to demodulate the intensity modulating first digital signal. Simultaneously, the other portion of the coupled signal is demodulated by either a coherent receiver using the heterodyne techniques employed in the first embodiment or a non-coherent receiver to recover the second digital signal.

DETAILED DESCRIPTION

Figure 1:
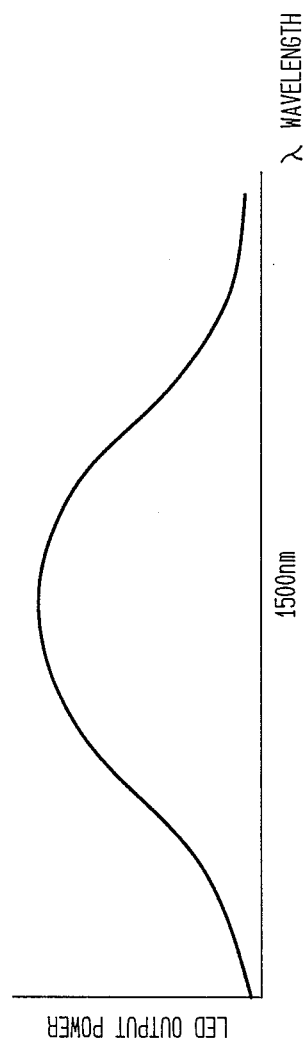
FIG. 1 shows the wide linewidth spectrum of a typical LED device.
Figure 2:
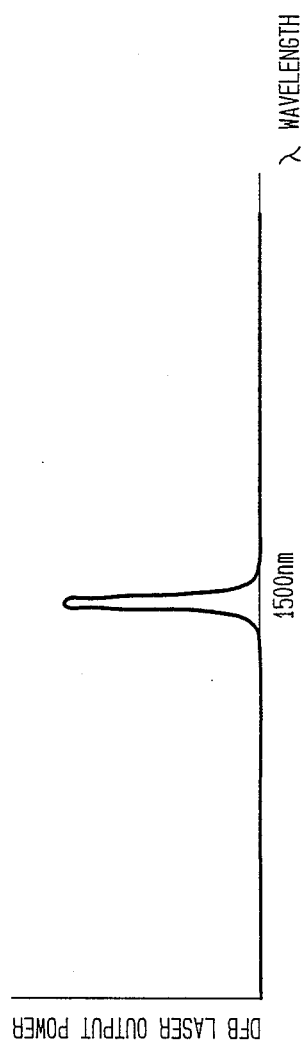
FIG. 2 shows the narrow linewidth spectrum of a typical DFB (Distributed Feedback) laser.

With reference to FIG. 1, the spectrum of a typical LED is shown. As can be noted, the spectrum of the LED is relatively wide as compared to the spectrum of a Distributed Feedback laser (DFB laser) which is shown in FIG. 2. Unlike the spectrum of the LED which is distributed with a low power output over a wide band of wavelengths, the DFB laser spectrum has a high power output that is localized at only the nominal operating wavelength of the laser, shown in FIG. 2 as 1500 nm. The wide linewidth distribution of the LED prevents ordinary wavelength-division multiplexing techniques from being readily employed to multiplex signals which modulate an LED and signals which modulate a DFB laser since crosstalk will create interference between the optical signals on the fiber.

Figure 3:
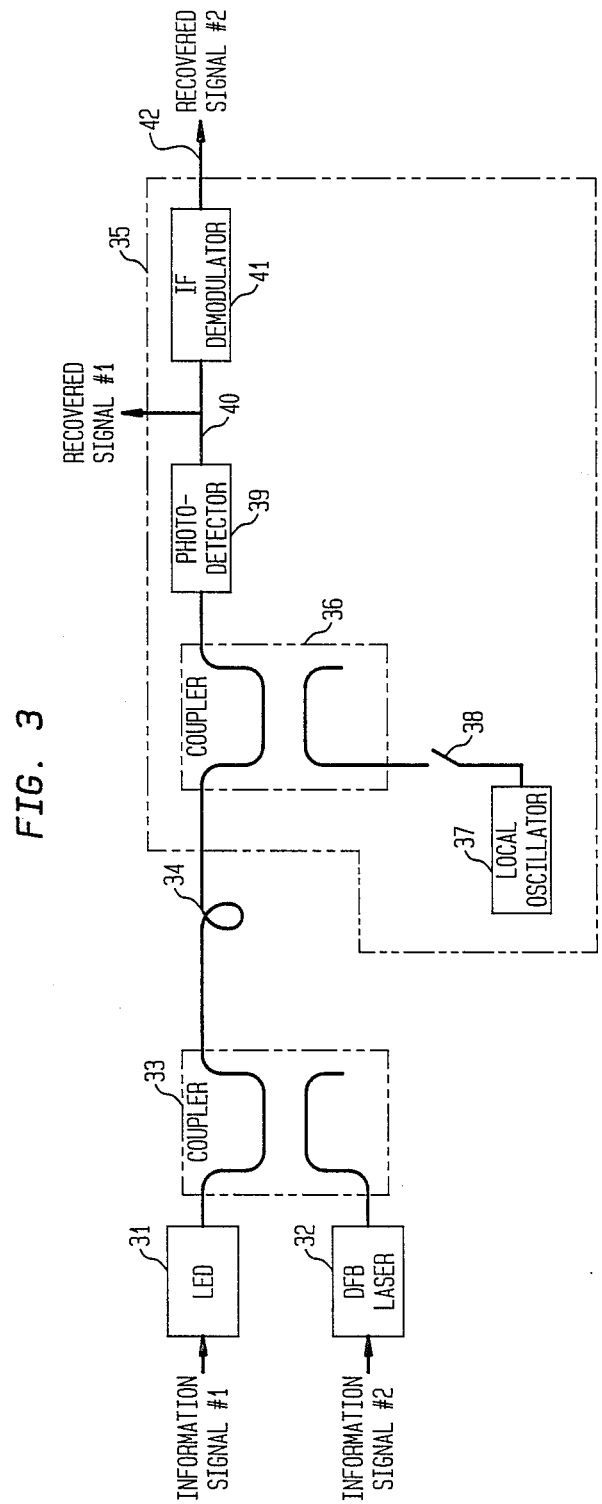
FIG. 3 is a block diagram of a first embodiment of a transmission system incorporating the present invention in which either the LED modulating digital signal or the laser modulating digital signal are detected at the receiver.

With reference to FIG. 3, a block diagram of a transmission system in accordance with the present invention is shown. In this system digital information signal #1 and digital information signal #2 modulate LED 31 and DFB laser 32, respectively. The modulated optical output signals of each are combined by optical coupler 33 and the combined signal is transmitted over a single mode optical fiber 34 to the receiving end where at any instant either information signal #1 or information signal #2 is recovered by the subscriber.

In order to separate the two signals at the receiver without crosstalk between them, the LED and DFB laser are modulated in such a manner that the modulating signals can be independently detected. In particular, the LED is intensity modulated such that digital information signal #1 turns LED ON and OFF in accordance with the "1"s and "0"s in the signal. The DFB laser is modulated using angle modulation, either phase or frequency. In the embodiments of the invention described herein, it will be assumed that frequency modulation is employed although phase modulation could equally be employed. Since the frequency and thus wavelength of the optical output of DFB laser is dependent upon the current, I, through the laser, by modulating the current through the laser between a first and second current $I_1$ and $I_2$, respectively, in response to the "1"s and "0"s of the modulating digital information signal #2, the optical output wavelength varies between $\lambda_1$ and $\lambda_2$, corresponding to frequencies $f_1$ and $f_2$, respectively. The optical output is thus FSK (Frequency Shift Keying) modulated.

At the receiver 35, the subscriber elects to demodulate either information signal #1 or information signal #2. Receiver 35 includes an optical coupler 36 which combines the signal received over single mode fiber 34 and the output of an optical local oscillator 37 which is inputted to coupler 36 through a switch 38. The optical output of coupler 36 is applied to a photodetector which converts its input optical signal to an electrical signal on lead 40.

When switch 38 is open, the optical signal on fiber 34 is coupled directly on photodetector 39 without being mixed with the signal from local oscillator 37. Whereas the intensity modulating information signal #1 modulates the power of the transmitted optical signal, the FSK modulating information signal #2 maintains a constant power output by modulating the wavelength of the transmitted optical signal. Accordingly, when switch 38 is open, photodetector 39 detects only the changes in light power created by the modulating information signal #1. The output electrical signal on lead 40 is therefore the recovered information signal #1.

When switch 38 is closed, receiver 35 acts as a narrowband coherent receiver which demodulates the FSK modulating information signal #2 without interference from the intensity modulating information signal #1. When switch 38 is closed, local oscillator 37 signal "beats" with the signal received over fiber 34. Oscillator 37 has a frequency equal to $f_{center} + \Delta$, where $f_{center}$ is the center frequency between the $f_1$ and $f_2$, and $\Delta$ is the intermediate frequency of the coherent receiver. For example, for a data signal of 140 Mb/sec, typically $\Delta$ would be between 300 and 400 MHz. The electrical output of photodetector 39 includes an IF current component the frequency of which varies between the two frequency $f_1$ and $f_2$ in accordance with the bits of the modulating digital signal. This IF current on lead 40 is demodulated by a standard IF demodulator 41 which demodulates the IF current to reproduce on lead 42 information signal #2. IF demodulator also serves to filter all amplitude modulating power from the modulated LED 31, thereby eliminating interference between the two modulating signal and enabling detection of digital information signal #2 without crosstalk from digital information signal #1.

Receiver 35 therefore acts as a direct detection receiver when switch 38 is open such that digital information signal #1 is detected without interference from information signal #2, and as a coherent receiver for detecting information signal #2 without interference from signal #1 when switch 38 is closed. The subscriber thus has the option to elect to receive different digital information services that may be available. Further, a subscriber already having LED terminal equipment in place can upgrade his terminal with additional components to detect the services that may be "piggybacked" onto the basic service.

Figure 4:
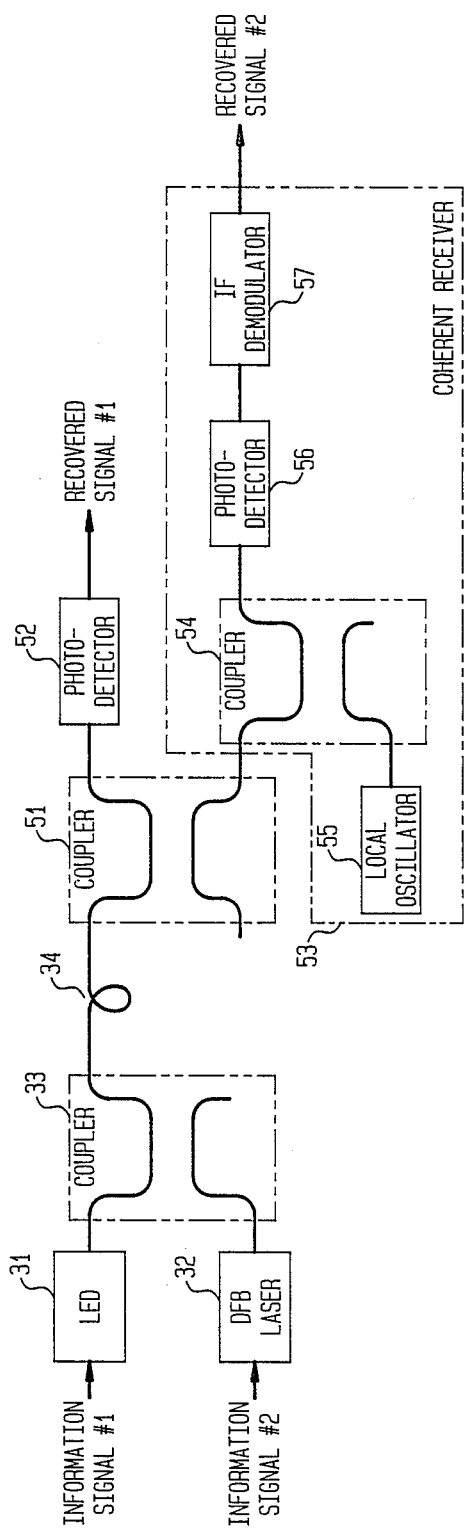
FIG. 4 is a block diagram of a second embodiment of a transmission system incorporating the present invention in which the LED modulating digital signal and the laser modulating digital signal are detected independently at the receiver by means of a direct detector receiver and a coherent receiver, respectively.

With reference to FIG. 4, a block diagram of a transmission system is shown that enables the subscriber to simultaneously demodulate and detect information signals d#1 and #2. The same numerical designations have been given to those components in FIG. 4 which are common to components in FIG. 3. The transmitter includes, as in FIG. 3, and LED 31, upon which is intensity modulated information signal #1, and DFB laser 32, upon which is frequency modulated information signal #2. Coupler 33 combines the optical outputs of LED 31 and DFB laser 32 and the combined optical signal is transmitted over single mode optical fiber 34 to the subscriber's receiver. At the receiver an optical coupler 51 divides the received optical signal into two portions. One portion is coupled to a photodetector 52 which, like photodetector 39 in FIG. 3, demodulates the intensity variations of the received optical signal to recover information signal #1 without any interference from the frequency variations imposed from the optical signal by the modulation of information signal #2.

The second portion of the output of coupler 51 is inputted to a coherent receiver 53. Receiver 53 includes a second coupler 54 for combining the second output portion of coupler 51 with the output of a local oscillator 55. Coherent receiver 53 functions identically to receiver 35 in FIG. 3 when switch 35 therein is closed. Accordingly, the optical output of coupler is detected by photodetector 56 and demodulated by IF demodulator 57 to recover information signal #2 without interference from information signal #1.

Although the embodiments described above have assumed that only one DFB laser output singal is multiplexed with the output of a LED, plural DFB lasers could be wavelength-division multiplexed and then multiplexed with the LED modulated signal. By tuning each DFB to a different center frequency and separating the spectra sufficiently apart to prevent overlap when each laser is FSK modulated, many channels can be simultaneously transmitted and multiplexed with the LED channel without interference. At the receiver, either plural local osillators can be employed to detect the multiple signals or a tunable local oscillator could be employed to tune to the desired "channel."

As plural DFB signals are inputted to a photodetector, however, the additional shot noise generated in the photodetector by the DFB signal needs to be considered. In particular the ratio of the power spectral density (PSD) $\eta_{SN}$ of the additional shot noise induced in the photodetector to the power spectral density $\eta_{TN}$ of the thermal noise always present at the detector needs to be maintained at a low value.

A typical noise current is approximately:

$$10 pA/\sqrt{Hz} = 10^{-11} A/\sqrt{Hz} \tag{1}$$

The thermal noise PSD is thus given by the square of the noise current:

$$\eta_{TN} = 10^{-22} A^2/Hz \tag{2}$$

The PSD of the additional shot noise is given by:

$$\eta_{SN} = 2qRP \qquad (3)$$

where q is the electron charge ($1.6 \cdot 10^{-19}$), R is the responsivity of the photodetector, typically 1A/watt at 1.5μm, and P is the signal power.

To maintain the sensitivity penalty small, $$\eta_{SN}/\eta_{TN} \leq 0.1 \qquad (4)$$

Making substitutions hereinabove yields, $$P \leq \frac{.1\eta_{TN}}{2qR} = \frac{(.1)(10^{-22})}{(2)(1.6 \cdot 10^{-19})(1)} \qquad (5)$$

$$P \leq 3.1 \cdot 10^{-5} \, W = 31 \, \mu W = -15 \, dBm \qquad (6)$$

The requirements is therefore that the signal power P of all signals simultaneously inputted to the photodetector must be less than 31μW. If the heterodyne receiver sensitivity is −40 dBm (approximately 80 nW), then $$\frac{31 \cdot 10^{-6}}{80 \cdot 10^{-9}} = 387 \qquad (7)$$

channels can be transmitted. If a 10 dB margin is assumed in the system, then the received power is −30 dBm (approximately 800 nW) and $$\frac{31 \cdot 10^{-6}}{800 \cdot 10^{-9}} = 38 \qquad (8)$$

channels can be transmitted.

Figure 5:
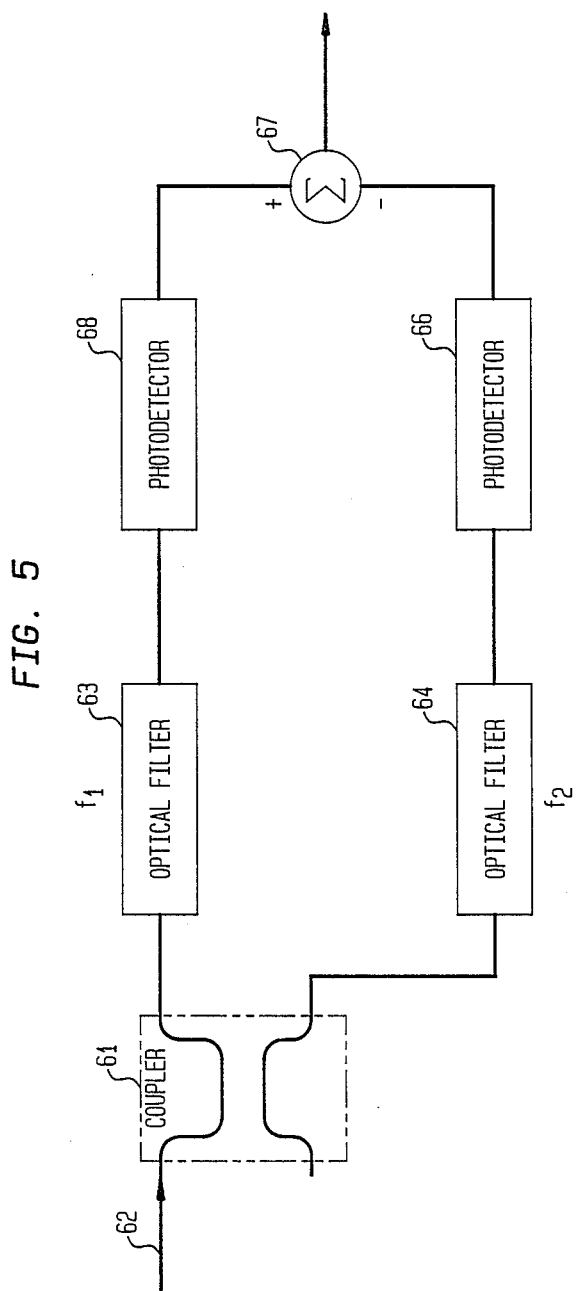
FIG. 5 is a block diagram of a non-coherent receiver than can be employed to detect the laser modulating digital signal in place of the coherent receiver in FIG. 4.

In the embodiments of the present invention described above, heterodyne techniques employing a coherent receiver were employed to demodulate the received FSK modulated DFB signal. Although present lightwave component technology makes coherent detection preferred for FSK systems, non-coherent FSK detection is theoretically possible and as component technology advances, non-coherent FSK detection could become a viable alternative. With reference to FIG. 5, a block diagram of a non-coherent FSK receiver is disclosed which could replace the coherent receiver 53 in FIG. 4. The receiver includes a coupler 61 which divides the input optical signal from optical path 62 into two equal portions. One portion is coupled to optical filter 63 having a pass frequency $f_1$ and the other portion is coupled to optical filter 64 having a pass frequency $f_2$. Assuming that the bandwidths of filters 63 and 64 do not overlap, at any instant a output will be present at one and only one of the filters. The output of filter 63 is inputted to photodetector 65 and the output of filter 64 is inputted to photodetector 66. The electrical outputs of photodetectors 65 and 66 are subtracted by signal combiner 67, the output being positive or negative, depending upon the transmitted bit.

As aforenoted, currently available optical components may make such a non-coherent optical receiver difficult to implement. Particularly, currently available optical filters have a fairly wide bandwidth. Thus in order for an output to be present at any instant at only filter 63 or filter 64, frequencies $f_1$ and $f_2$ must be sufficiently far apart which may result in modulation problems. As filter technology improves and more sharply defined optical filters become available, a non-coherent receiver may be easier to implement.

The transmission system of the present invention which multiplexes the wide linewidths LED source and the narrow linewidth laser source has been described heretofore in conjunction with a narrow linewidth DFB laser source. Other narrow linewidth laser sources could equally be employed such as a Distributed Bragg Reflector (DBR) laser, an external cavity laser, or a helium-neon (gas) laser.

The above-described embodiments are illustrative of the principles of the present invention. Other embodiments could be devices by those skilled in the art without departing from the spirit and scope of the present invention.

What is claimed is:

1. An optical transmission system for simultaneously transmitting plural digital signals between a transmitting end and a receiving end over a single mode optical fiber comprising:
   at the transmitting end, a wide linewidth optical device for intensity modulating a first of said digital signals, a narrow linewidth optical device for angle modulating a second of said digital signals, and means for combining the outputs of said wide and narrow linewidth optical devices for transmission over the single mode fiber,
   and at the receiving end, means for recovering the first of said digital signals by detecting the intensity variations in the optical signal received over the single mode fiber, and means for recovering the second of said digital signals by detecting the angle variations in the optical signal received over the single mode fiber.

2. A transmission system in accordance with claim 1 wherein said wide linewidth optical device is an LED and said narrow linewidth optical device is a narrow linewidth laser.

3. A transmission system in accordance with claim 2 wherein said laser FSK (frequency shift keying) modulates and second digital signal.

4. A transmission system in accordance with claim 3 wherein said means for recovering the second of said digital signals comprises a coherent receiver.

5. A transmission system in accordance with claim 4 wherein said coherent receiver comprises a local optical oscillator, means for combining the received optical signal with the output of said local oscillator, means for converting to an IF (intermediated frequency) FSK electrical signal the output of said combining means in said receiver and means for demodulating the FSK electrical signal to reconstruct said second digital signal.

6. A transmission system in accordance with claim 5 further comprising at the receiving end means for electing to recover either said first or second of said digital signals.

7. A transmissoin system in accordance with claim 5 further comprising at the transmitting end, plural narrow linewidth lasers for FSK modulating plural digital signals, and means for wavelength-division multiplexing the outputs of said plural lasers to form one optical input to said combining means.

8. A transmission system in accordance with claim 7 further comprising at the receiving end, plural coherent receivers for recovering said plural digital signals wavelength-division multiplexed on said plural lasers.

9. A transmission system in accordance with claim 8 further comprising at the receiving end, a tunable local oscillator for selectively recovering said digital signals wavelength-division multiplexed on said plural lasers.

10. A transmission system in accordance with claim 1 wherein said means for recovering the first of said digital signal comprises a photodetector.

11. For use in an optical transmission system which transmits plural digital signals over a single mode optical fiber between a transmitting end and a receiving end, said transmitting end comprising:
   a wide linewidth optical device for intensity modulating a first of said digital signals,
   a narrow linewidth optical device for angle modulating a second of said digital signal, and
   means for combining the outputs of said wide and narrow linewidth optical device for transmission over the optical fiber.

12. The transmitting end of an optical transmission system in accordance with claim 11 wherein said wide linewidth optical device is an LED and said narrow linewidth optical device is a narrow linewidth laser.

13. The transmitting end of an optical transmission system in accordance with claim 12 wherein said laser FSK modulates said second digital signal.

14. The transmitting end of an optical transmission system in accordance with claim 12 further comprising plural narrow linewidth lasers for FSK modulating plural digital signals, and means for wavelength-division multiplexing the outputs of said plural lasers to form one optical input to said combining means.

15. For use in optical transmission system which transmits plural digital signals over a single mode optical fiber between a transmitting end and a receiving end, a first of said digital signals intensity modulating a wide linewidth optical source and a second of said digital signals angle modulating a narrow linewidth optical source, said narrow and wide linewidth optical sources being combined for transmission over the optical fiber, said receiving end comprising:
   photodetector means for recovering the first of said digital signals by detecting the intensity variations in said received optical signal, and
   means for recovering the second of said digital signals by detecting the angle variations in said received optical signal.

16. The receiving end in accordance with claim 15 wherein said means for recovering the second digital signal comprises a coherent receiver.

17. The receiving end in accordance with claim 16 wherein the angle modulation of the second digital is FSK modulation and said coherent receiver comprises a local oscillator, means for combining the received optical signal with the output of said local oscillator, means for converting to an IF (intermediate frequency) FSK electrical signal the output of said combining means in said receiver and means for demodulating the FSK electrical signal to reconstruct said second digital signal.

18. The receiving end in accordance with claim 16 further comprising means for electing to recover either said first or second of said digital signals.

19. The receiving end in accordance with claim 15 wherein said means for recovering the second digital signal comprises a non-coherent receiver.

20. The receiving end in accordance with claim 19 wherein said non-coherent receiver comprises first optical filter means having a frequency passband around the optical frequency associated with the binary "1"s in said second digital signal, second optical filter means having a frequency passband around the optical frequency associated with the binary "0"s in the second digital signal, first and second photodetector means for converting the outputs of said first and second optical filter means, respectively, to electrical signals, and means for reconstructing said second digital signal from the difference between said electrical signals at the outputs of said first and second photodetector means.

* * * * *

UNITED STATES PATENT AND TRADEMARK OFFICE
CERTIFICATE OF CORRECTION

PATENT NO. : 4,824,201
DATED : April 25, 1989
INVENTOR(S) : Leonid G. Kazovsky

It is certified that error appears in the above-identified patent and that said Letters Patent is hereby corrected as shown below:

Column 1, line 29, change "filter" to --fiber--.
Column 3, line 30, change "on" to --to--.
Column 4, line 11, change "d#1" to --#1--.
Column 4, line 26, change "from" to --upon--.
Column 6, line 40, change "and second" to --said second--.

Signed and Sealed this

Sixth Day of November, 1990

*Attest:*

HARRY F. MANBECK, JR.

*Attesting Officer*     *Commissioner of Patents and Trademarks*